(12) United States Patent
Pares Criville

(10) Patent No.: US 6,604,914 B2
(45) Date of Patent: Aug. 12, 2003

(54) PUMP FOR SEA WATER DESALINATION SYSTEMS BY REVERSE OSMOSIS

(75) Inventor: Antonio Pares Criville, Sabadell (ES)

(73) Assignee: Bolsaplast, S.A., Barcelona (ES)

( * ) Notice: Subject to any disclaimer, the term of this patent is extended or adjusted under 35 U.S.C. 154(b) by 66 days.

(21) Appl. No.: 09/682,532

(22) Filed: Sep. 17, 2001

(65) Prior Publication Data

US 2003/0017061 A1 Jan. 23, 2003

(30) Foreign Application Priority Data

Jul. 21, 2001 (ES) .......................... 200101768

(51) Int. Cl.[7] .......................... F04B 23/00; F04B 39/00; F04B 53/00
(52) U.S. Cl. .......................... 417/313; 210/98
(58) Field of Search .......................... 417/313, 404, 417/534, 318; 210/137, 136, 134, 98, 101, 257.2, 652, 637

(56) References Cited

U.S. PATENT DOCUMENTS

| 4,288,326 A | * | 9/1981 | Keefer | 210/637 |
| 4,432,876 A | * | 2/1984 | Keefer | 210/652 |
| 4,632,754 A | * | 12/1986 | Wood | 210/257.2 |
| 4,830,583 A | * | 5/1989 | Edson | 417/318 |
| 4,913,809 A | * | 4/1990 | Sawada et al. | 210/98 |
| 4,929,347 A | * | 5/1990 | Imai et al. | 210/101 |
| 5,006,234 A | * | 4/1991 | Menon et al. | 210/98 |
| 5,007,812 A | * | 4/1991 | Hartt | 417/534 |
| 5,154,820 A | * | 10/1992 | Solomon | 210/134 |
| 5,785,504 A | * | 7/1998 | Cote | 417/313 |
| 6,017,200 A | * | 1/2000 | Cilds et al. | 417/404 |
| 6,068,764 A | * | 5/2000 | Chau | 210/136 |
| 6,491,813 B2 | * | 12/2002 | Verde | 210/137 |

* cited by examiner

Primary Examiner—Teresa Walberg
Assistant Examiner—Leonid Fastovsky
(74) Attorney, Agent, or Firm—Bazerman & Drangel PC

(57) ABSTRACT

This pump has two end chambers (2, 3) in which are housed two pistons (4, 5) which pump sea water towards an reverse osmosis membrane (7), and a central chamber (8) in which a sliding block is housed, activated by displacement of the pistons (4 and 5) performing the piloting of a directional valve (9). This pump alternatively provokes the inversion of the external pressure intake towards the front areas of the end chambers (2, 3) and the inversion of the pressure intake of the water rejected by the membrane towards the rear areas of said chambers (2, 3).

9 Claims, 3 Drawing Sheets

PUMP FOR SEA WATER DESALINATION SYSTEMS BY REVERSE OSMOSIS

BACKGROUND OF INVENTION

1. Object of the Invention

The present invention refers, as the title indicates, to a pump for sea water desalination systems by reverse osmosis, of the type having two end chambers in which two pistons are housed which describe alternative movements, alternatively pumping sea water towards an reverse osmosis membrane pertaining to a desalination system, moreover, said system including a directional valve activated by a pilot valve which in turn is actuated by the own displacement of the pistons.

2. Background of the Invention

Currently, there are different pumps or pumping systems applicable to sea water desalination, which include a hydraulic cylinder, in which two pistons are housed and move alternatively to pump the sea water towards the osmosis membrane.

Generally, these systems include a directional valve permitting the pressure of the water rejected by the osmosis membrane to be harnessed, using it to collaborate in the piston cylinder and therefore increase the pressure of the water supplied to the membrane.

In this section, the U.S. Pat. No. 5,462,414, WO 98/22202, U.S. Pat. Nos. 4,367,140 and 4,793,153 describing similar systems should be mentioned.

To provoke inversion in the direction of the piston movement, said patents include a hydraulic circuit, always requiring the use of anti-return valves to permit their operation, moreover incorporating pilot and directional valves separated from the pump body, hence presenting different problems, on the one hand, the existence of a high number of outside conduits with the consequent risk of breakage and pressure losses, and on the other hand, making the anti-return valves useless due to the formation of saline deposits in the emplacement area thereof.

SUMMARY OF INVENTION

To solve the above problems, the pump for sea water desalination systems by reverse osmosis object of this invention, has been created having constructional features directed on the one hand, to permit operation without anti-return valves and on the other, to obtain a compact equipment with a very reduced number of external conduits.

Said pump, being of the type which have two end chambers in which the two pistons are housed, has the particularity that the pump body has a third chamber centrally arranged between the two end chambers, provided with an outside pressure intake, with two end mouths connected to the directional valve and an intermediate mouth connected to a water outlet conduit, said chamber housing a sliding block having a side cavity forming a closure with the wall of said third chamber. The sliding block carrying out, according to its position, the alternative opening of the end mouths connected to the directional valve and the interconnection by means of the lateral cavity of the other two mouths, simultaneously allowing the entry of pressure from the intermediate chamber to the directional valve and the guidance of water coming from the directional valve to the water outlet conduit.

This third chamber defined in the pump body, precisely constitutes the pilot valve of the directional valve.

The aforementioned sliding block, housed in the central chamber of the pump body internally has a hole for the passage of the piston shaft and an internal recess in which a thicknessing is housed with the possibility of longitudinal displacement, this thicknessing being entrusted with the displacement of the sliding block inside the third chamber of the pump when the pistons are next to the ends of their run.

According to the invention, the directional valve has a tubular body interlocked to the pump body and provided with two end compartments and two intermediate compartments, in which are housed, respectively, two pistons and two guides interlocked by a common shaft with possibility of simultaneous alternative displacement.

The end compartments of the directional valve are respectively connected to the end mouths of the pilot valve.

According to the invention, one of the intermediate compartments of the directional valve is connected to the reverse osmosis membrane intake and has two end mouths connected to the front areas of the end chambers of the pump body and a central mouth connected to the pressure intake and to the central chamber of the pump body. The guide arranged inside the mentioned intermediate component has a lateral cavity alternatively communicating the pressure intake with the front area of the end chambers of the pump body, permitting the alternative connection of the front areas of said end chambers of the pump with the mentioned intermediate compartment of the directional valve.

The other intermediate compartment of the directional valve is connected to the outlet of water outlet rejected by the reverse osmosis membrane and has two end mouths connected to the rear areas of the end chambers of the pump body and a central mouth connected to the intermediate mouth of the central chamber of the pump body and the water outlet to the exterior. The guide housed in this compartment has a lateral cavity, alternatively communicating the rear area of the end chambers of the pump body with the water outlet to the exterior, also alternatively permitting the connection of the rear areas of the end chambers of the pump body with said intermediate compartment of the directional valve.

The assembly of the directional valve over the pump body permits that the conduits relating it to the end chambers of the pump are internally defined and the guides housed inside the directional valve may perform, by means of the corresponding cavities, the interconnection in pairs of the mouths defined in the intermediate compartments of said directional valve, causing according to the direction of displacement of the pump pistons, the direction of the water under pressure towards the reverse osmosis membrane intake and the guidance of the water rejected by the osmosis membrane towards one of the rear areas of the end chambers of the pump.

BRIEF DESCRIPTION OF DRAWINGS

To complement the description being made and to facilitate the understanding of the features of the invention, this specification is accompanied by a set of drawings, which, with an illustrative and non-limiting character, show the following.

DETAILED DESCRIPTION

Figure 1:
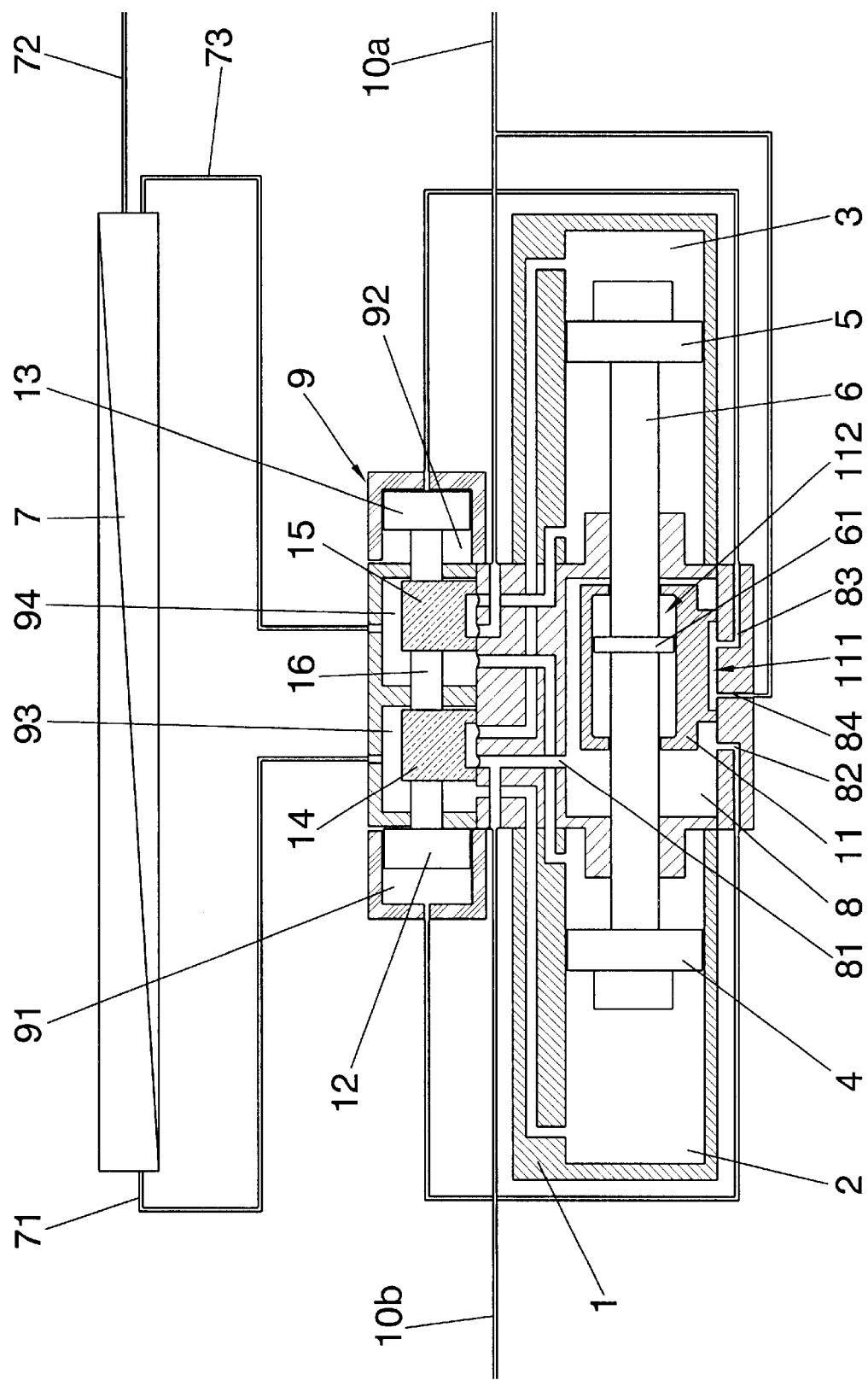
FIGS. 1 and 2 show two schematic elevational views of the pump object of the invention, longitudinally sectioned and connected to a reverse osmosis membrane, it being possible to observe in said figures the pilot valve and directional valve guides in the two end positions.
Figure 2:
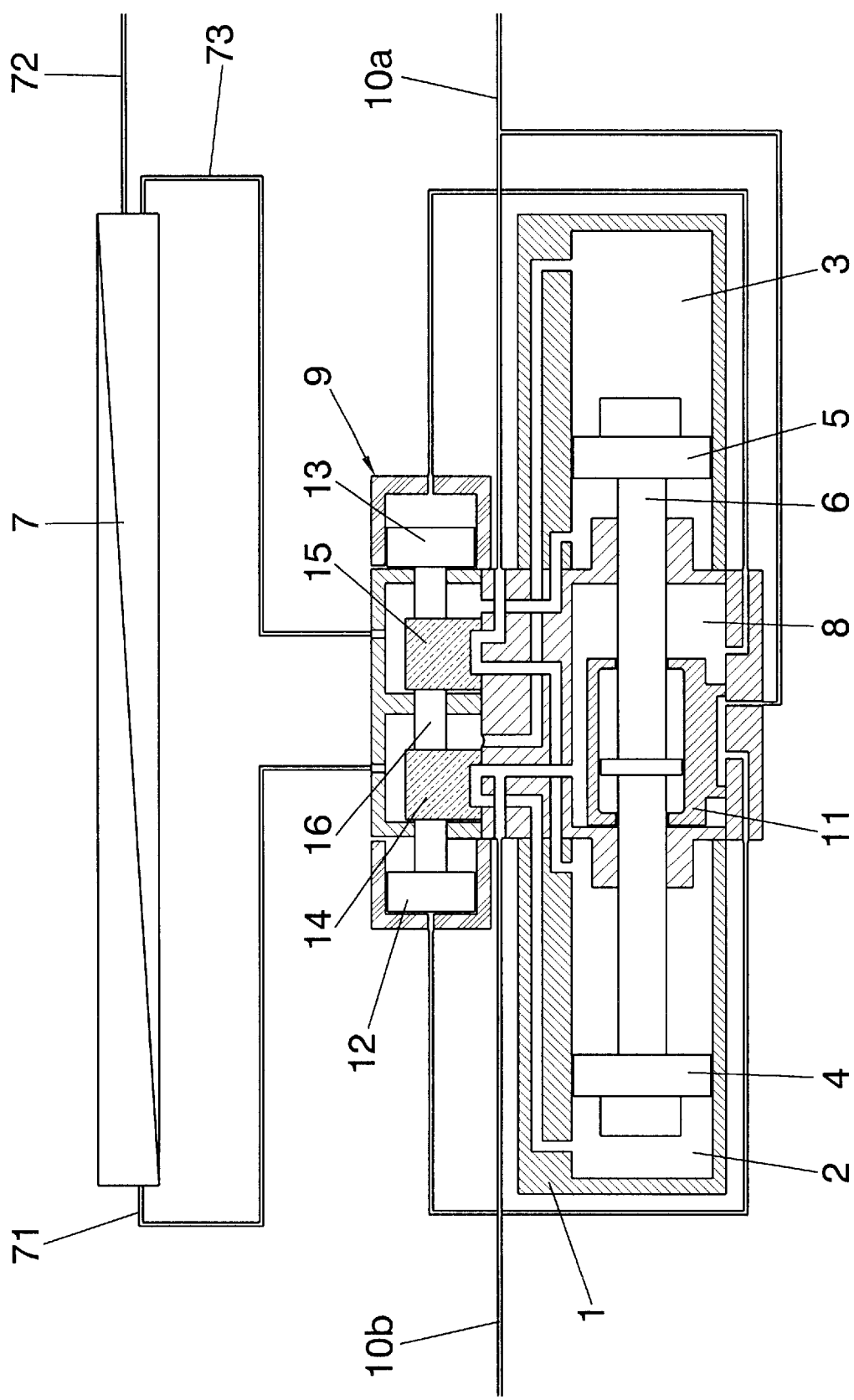
Figure 3:
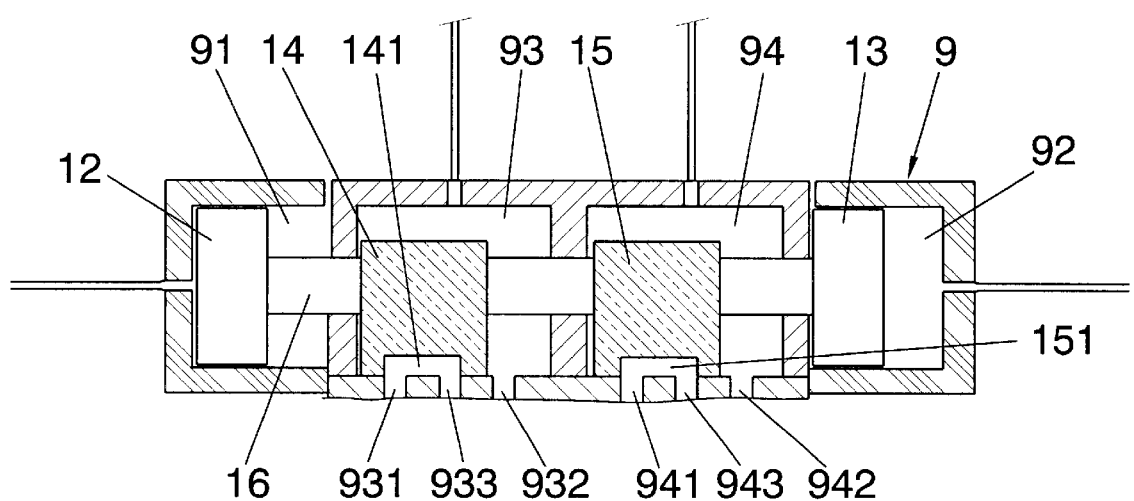
FIG. 3 shows an extended detail of the directional valve with the sliding blocks shown in the same position as in FIG. 2.

As may be seen in the mentioned figures, the pump object of the invention has a body (1) with two end chambers (2, 3) in which two pistons (4, 5) are housed and joined by a common shaft (6).

The pistons (4, 5) describe alternative movements alternatively pumping sea water, towards the intake (71) of a reverse osmosis membrane (7) of a desalination system and which is provided with one outlet (72) for the desalinated and osmotised water and an outlet (73) for the rejected water.

The pump body (1) has in its middle, a central chamber (8) with an external pressure intake (81), two end mouths (82, 83) connected to the directional valve (9) and an intermediate mouth (84) connected to a water outlet conduit (10a).

In the central chamber (8), a sliding block (11) is housed, laterally having a cavity (111) which according to its position, performs the alternative opening of the end mouths (82, 83) and their alternative connection with the intermediate mouth (84), alternatively transmitting the water pressure introduced in the central chamber (8) across the external intake (10b) towards the end compartments (91, 92) of the directional valve and the water coming from the end compartments (92, 91) of the directional valve to the water outlet conduit (10a).

The sliding block (11) is internally provided with a hole for the passage of the shaft (6) and an internal recess (112) in which a thicknessing (61) is housed with the possibility of longitudinal displacement, entrusted with provoking movement of the sliding block (11) between the two positions shown in the figures.

The directional valve (9) is interlocked with the body (1) of the pump and besides the two end compartments (91, 92), has two intermediate compartments (93, 94); in said compartments (91, 92, 93, 94), two pistons (12, 13) and two guides (14, 15) interlocked by a common shaft (16) are respectively housed.

The intermediate compartment (93) of the directional valve is connected to the reverse osmosis membrane (7) intake (71); said compartment (93) having two end mouths (931, 932) connected to the front areas of the end chambers (2 and 3) of the pump and a central mouth (933) connected to the pressure intake (11) and the central chamber (8).

The guide (14) has a lateral cavity (141) alternatively communicating the central mouth (933) with the end mouths (931 and 932), provoking the alternative pressure intake towards the front area of the end chambers (2 and 3) and the connection, also alternative, of the front areas of said end chambers (2, 3) with the intermediate compartment (93) of the directional valve.

The intermediate compartment (94) of the directional valve is connected to the outlet of water rejected (73) from the membrane (7) and has two end mouths (941, 942) connected to the rear areas of the end chambers (2 and 3) of the pump body, and a central mouth (943) connected to the intermediate mouth (84) of the central chamber (8) and to the water outlet (10a) to the exterior.

The guide (15) housed in the intermediate compartment (94), has a lateral cavity (151) which alternatively communicates the rear area of the end chambers (2 and 3) with the outlet (10a), also alternatively permitting the passage of pressure from water rejected by the membrane towards the rear areas of the end chambers (2 and 3).

Once the nature of the invention has been sufficiently described, as well as an example of a preferred embodiment, it is recorded for the relevant purposes, that the materials, shape, size and arrangement of the components described may be modified, provided this does not involve a change of the essential features of the invention claimed below.

What is claimed is:

1. A pump for sea water desalination systems by reverse osmosis;

said pump being of the type baying two end chambers (2, 3) in which two pistons (4, 5) are housed, which describe alternative movements, alternatively pumping sea water towards a reverse osmosis membrane (7) of a desalination system, said desalination system moreover including a directional valve (9) activated by a pilot valve, the latter being activated by the displacement of the pistons (4, 5);

comprising in that the body of the pump (1) has a centrally arranged third chamber (8) between the two end chambers (2, 3), provided with an external pressure intake (81), with two end mouths (82, 83) connected to the directional valve (9) and with an intermediate mouth (84) connected to a water outlet conduit (10a), being housed in said central chamber (8) a sliding block (11), laterally having a cavity (111) forming a closure with the wall of said third chamber (8);

the sliding block (11) performing, according to its position, the alternative opening of the end mouths (82, 83) connected to the directional valve (9) and the interconnection by means of the lateral cavity (111) of the other two mouths (82, 84), (83, 84), simultaneously permitting pressure intake from the intermediate chamber (8) to the directional valve (9) and die guidance of water from the directional valve (9) to the water outlet conduit (10a).

2. A pump according to claim 1 wherein the sliding block (11) internally has a hole for the passage of the piston (4, 5) shaft (6) and an internal recess (112) in which is housed, with possibility of longitudinal displacement, a thicknessing (61) defined in the middle area of the shaft (6) and entrusted with displacing the sliding block (11) inside the central chamber (8) of the pump.

3. A pump according to claims 1 or 2 wherein the directional valve (9) has a tubular body interlocked with the body (1) of the pump and presided with two end compartments (91, 92) and two intermediate compartments (93, 94) in which are housed, respectively, and with possibility of simultaneous alternative displacement, two pistons (12, 13) and two guides (14, 15) interlocked by a common shaft (16).

4. A pump according to claim 3 wherein the end compartments (91, 92) of the directional valve (9) are respectively connected to the end mouths (82, 83) of the pilot valve.

5. A pump according to claim 3 wherein the intermediate compartment (93) of the directional valve is connected to the intake (71) of the reverse osmosis membrane (7) and has two end mouths (931, 932) connected to the form the areas of the end chambers (2, 3), and a central mouth (933) connected to the pressure intake (10b) and the central chamber (8); the guide (14), housed in said compartment, having a lateral cavity (141) alternatively communicating the pressure intake (10b) with the front area of the end chambers (2, 3) of the pump body (1), also permitting the alternative connection of the front areas of said end chambers (2, 3) with the mentioned intermediate compartment (93) of the directional valve.

6. A pump according to the claim 3 wherein the intermediate compartment (94) of the directional valve is connected to the outlet (73) of water rejected by the reverse osmosis membrane and has two end mouths (941, 942) connected to the rear areas of the end chambers (2, 3) of the pump body and a central mouth (943) connected to the intermediate mouth (84) of the central chamber (8) of the pump body and to the water outlet (10a) to the exterior; the guide (15) housed in said compartment (94) having a lateral cavity (151) alternatively communicating the rear area of the end chambers (2, 3) of the body (1) of the pump with the water outlet (10a) to the exterior, also alternatively permitting the connection of the rear areas of the end chambers (2, 3) with said intermediate compartments (94) of the directional valve.

7. A pump according to claim 4 wherein the intermediate compartment (93) of the directional valve is connected to the intake (71) of the reverse osmosis membrane (7) and has two end mouths (931, 932) connected to the front areas of the end chambers (2, 3), and a central mouth (933) connected to the pressure intake (10b) and the central chamber (8); the guide (14), housed in said compartment, having a lateral cavity (141) alternatively communicating the pressure intake (10b) with the front area of the end chambers (2, 3) of the pump body (1), also permitting the alternative connection of the front areas of said end chambers (2, 3) with the mentioned intermediate compartment (93) of the directional valve.

8. A pump according to the claim 4 wherein the intermediate compartment (94) of the directional valve is connected to the outlet (73) of water rejected by the reverse osmosis membrane and has two end mouths (941, 942) connected to the rear areas of the end chambers (2, 3) of the pump body and a central mouth (943) connected to the intermediate mouth (84) of the central chamber (8) of the pump body and to the water outlet (10a) to the exterior; the guide (15) housed in said compartment (94) having a lateral cavity (151) alternatively communicating the rear area of the end chambers (2, 3) of the body (1) of the pump with the water outlet (10a) to the exterior, also alternatively permitting the connection of the rear areas of the end chambers (2, 3) with said intermediate compartments (94) of the directional valve.

9. A pump according to the claim 5 wherein the intermediate compartment (94) of the directional valve is connected to the outlet (73) of water rejected by the reverse osmosis membrane and has two end mouths (941, 942) connected to the rear areas of the end chambers (2, 3) of the pump body and a central mouth (943) connected to the intermediate mouth (84) of the central chamber (8) of the pump body and to the water outlet (10a) to the exterior; the guide (15) housed in said compartment (94) having a lateral cavity (151) alternatively communicating the rear area of the end chambers (2, 3) of the body (1) of the pump with the water outlet (10a) to the exterior, also alternatively permitting the connection of the rear areas of the end chambers (2, 3) with said intermediate compartments (94) of the directional valve.

* * * * *